United States Patent
Kim

(10) Patent No.: US 10,570,845 B2
(45) Date of Patent: *Feb. 25, 2020

(54) METHOD AND APPARATUS FOR DIAGNOSING ENGINE SYSTEM

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 64 days.

This patent is subject to a terminal disclaimer.

(21) Appl. No.: 15/831,171

(22) Filed: Dec. 4, 2017

(65) Prior Publication Data
US 2018/0163658 A1    Jun. 14, 2018

(30) Foreign Application Priority Data

Dec. 9, 2016 (KR) .......................... 10-2016-0167760

(51) Int. Cl.
*F01L 1/34* (2006.01)
*F02D 41/22* (2006.01)
(Continued)

(52) U.S. Cl.
CPC .............. *F02D 41/22* (2013.01); *F01L 1/356* (2013.01); *F01L 13/00* (2013.01); *F02D 13/02* (2013.01);
(Continued)

(58) Field of Classification Search
CPC .. F02D 13/0215; F02D 41/0002; F02D 41/22; F02D 41/221; F02D 41/123; F01L 1/356; F01L 2800/11
(Continued)

(56) References Cited

U.S. PATENT DOCUMENTS 7,146,851 B2 * 12/2006 Wakahara ................. F01L 1/34
73/117.3
10,344,681 B2 * 7/2019 Kim ....................... F02M 26/49
123/90.15
(Continued)

FOREIGN PATENT DOCUMENTS

EP    2 647 812 A1    10/2013
JP    2004-183591 A    7/2004
(Continued)

OTHER PUBLICATIONS

European Search Report for European Patent Application No. EP 17206368.7, dated Mar. 16, 2018, 10 pgs.

*Primary Examiner* — Ching Chang
(74) *Attorney, Agent, or Firm* — Morgan, Lewis & Bockius LLP

(57) ABSTRACT

A method and apparatus for diagnosing an engine system are provided. An apparatus for diagnosing an engine system including a continuous variable valve duration (CVVD) apparatus according to an exemplary embodiment of the present invention may include: an accelerator pedal position detector configured for detecting a position of an accelerator pedal; a brake pedal position detector configured for detecting a position of a brake pedal; a vehicle speed detector configured for detecting a speed of a vehicle; an intake pressure detector configured for detecting an intake pressure; and a controller configured for determining whether a fuel cut condition is satisfied and determining whether the CVVD apparatus is in a failure state when the fuel cut condition is satisfied.

14 Claims, 3 Drawing Sheets

(51) Int. Cl.
*F01L 13/00* (2006.01)
*F01L 1/356* (2006.01)
*F02D 13/02* (2006.01)
*F02D 41/00* (2006.01)
*F02D 41/12* (2006.01)

(52) U.S. Cl.
CPC ..... *F02D 13/0215* (2013.01); *F02D 41/0002* (2013.01); *F02D 41/221* (2013.01); *F01L 2800/11* (2013.01); *F02D 41/123* (2013.01); *F02D 2041/001* (2013.01); *F02D 2200/0406* (2013.01); *F02D 2200/501* (2013.01); *F02D 2200/602* (2013.01); *Y02T 10/18* (2013.01); *Y02T 10/42* (2013.01)

(58) Field of Classification Search
USPC .......................................... 123/90.15, 90.17
See application file for complete search history.

(56) References Cited

U.S. PATENT DOCUMENTS

| | | |
|---|---|---|
| 2004/0129238 A1 | 7/2004 | Nishida |
| 2005/0204805 A1 | 9/2005 | Wakahara et al. |
| 2015/0167560 A1 | 6/2015 | Wu et al. |

FOREIGN PATENT DOCUMENTS

| | | |
|---|---|---|
| JP | 2004-225542 A | 8/2004 |
| JP | 2005-248825 A | 9/2005 |
| JP | 4061720 B2 | 3/2008 |
| JP | 2009-250029 A | 10/2009 |
| KR | 10-1014476 B1 | 2/2011 |
| KR | 10-1655228 B1 | 9/2016 |
| KR | 10-1684558 B1 | 12/2016 |

\* cited by examiner

METHOD AND APPARATUS FOR DIAGNOSING ENGINE SYSTEM

CROSS-REFERENCE(S) TO RELATED APPLICATIONS

The present application claims priority to Korean Patent Application No. 10-2016-0167760 filed on Dec. 9, 2016, the entire contents of which are incorporated herein for all purposes by this reference.

BACKGROUND OF THE INVENTION

Field of the Invention

The present invention relates to a method of and apparatus for diagnosing an engine system. More particularly, the present invention relates to a method and apparatus for diagnosing an engine system including a continuous variable valve duration (CVVD) apparatus.

Description of Related Art

An internal combustion engine generates power by burning fuel in a combustion chamber in an air media drawn into the combustion chamber. Intake valves are operated by a camshaft to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal valve opening and closing timing of the valves depends on the rotation speed of the engine. To achieve such optimal valve operation depending on the rotation speed of the engine, various research, such as designing of a plurality of cams and a continuous variable valve lift (CVVL) apparatus that can change valve lift according to the engine speed, have been undertaken.

Also, to achieve such an optimal valve operation depending on the rotation speed of the engine, research has been undertaken on a continuous variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

Therefore, a continuous variable valve duration (CVVD) apparatus that can adjust a duration of a valve according to an operation state of the engine has been researched.

To apply the CVVD apparatus to the engine system, a method of diagnosing whether the CVVD apparatus is normally operating is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling and an apparatus for diagnosing an engine system having the advantages of being configured for diagnosing an engine system including a continuous variable valve duration apparatus.

A method of diagnosing an engine system including a continuous variable valve duration (CVVD) apparatus according to an exemplary embodiment of the present invention may include: detecting data for diagnosing the engine system; determining whether a fuel cut condition is satisfied based on the data; operating the CVVD apparatus wherein a duration of an intake valve becomes a first target duration when the fuel cut condition is satisfied; determining whether a decrease amount of an intake pressure by operation of the CVVD apparatus is within a first predetermined range; and determining that the CVVD apparatus is in a failure state when the decrease amount of the intake pressure by operation of the CVVD apparatus is not within the first predetermined range.

The method may further include: maintaining the duration of the intake valve to the first target duration for a predetermined time when the decrease amount of the intake pressure by operation of the CVVD apparatus is within the first predetermined range; monitoring the intake pressure at a time point at which the predetermined time has elapsed; and determining whether the intake pressure at the time point at which the predetermined time has elapsed is within a second predetermined range.

The method may further include determining that the CVVD apparatus is in the failure state when the intake pressure at the time point at which the predetermined time has elapsed is not within the second predetermined range.

The method may further include operating the CVVD apparatus wherein the duration of the intake valve becomes a second target duration when the intake pressure at the time point at which the predetermined time has elapsed is within the second predetermined range, wherein the second target duration is less than the first target duration.

The method may further include: determining whether an increase amount of the intake pressure by operation of the CVVD apparatus is within a third predetermined range; and determining that the CVVD apparatus is in the failure state when the increase amount of the intake pressure by operation of the CVVD apparatus is not within the third predetermined range.

The method may further include determining that the CVVD apparatus is in a normal state when the increase amount of the intake pressure by operation of the CVVD apparatus is within the third predetermined range.

An apparatus for diagnosing an engine system including a continuous variable valve duration (CVVD) apparatus according to an exemplary embodiment of the present invention may include: an accelerator pedal position detector configured to detect a position of an accelerator pedal; a brake pedal position detector configured to detect a position of a brake pedal; a vehicle speed detector configured to detect a speed of a vehicle; an intake pressure detector configured to detect an intake pressure; and a controller configured to determine whether a fuel cut condition is satisfied and whether the CVVD apparatus is in a failure state when the fuel cut condition is satisfied, wherein the controller operates the CVVD apparatus wherein a duration of an intake valve becomes a first target duration when the fuel cut condition is satisfied and determines that the CVVD apparatus is in the failure state when a decrease amount of the intake pressure by operation of the CVVD apparatus is not within a first predetermined range.

The controller may maintain the duration of the intake valve to the first target duration for a predetermined time when the decrease amount of the intake pressure by operation of the CVVD apparatus is within the first predetermined range, monitor the intake pressure at a time point at which the predetermined time has elapsed, and determine whether the intake pressure at the time point at which the predetermined time has elapsed is within a second predetermined range.

The controller may determine that the CVVD apparatus is in the failure state when the intake pressure at the time point at which the predetermined time has elapsed is not in the second predetermined range.

The controller may operate the CVVD apparatus wherein the duration of the intake valve becomes a second target duration when the intake pressure at the time point at which the predetermined time has elapsed is within the second predetermined range, and the second target duration may be less than the first target duration.

The controller may determine whether an increase amount of the intake pressure by operation of the CVVD apparatus is within a third predetermined range and determine that the CVVD apparatus is in the failure state when the increase amount of the intake pressure by operation of the CVVD apparatus is not within the third predetermined range.

The controller may determine that the CVVD apparatus is in a normal state when the increase amount of the intake pressure by operation of the CVVD apparatus is within the third predetermined range.

A method of diagnosing an engine system including a continuous variable valve duration (CVVD) apparatus according to another exemplary embodiment of the present invention may include: detecting data for diagnosing the engine system; determining whether a fuel cut condition is satisfied based on the data; operating the CVVD apparatus wherein a duration of an exhaust valve becomes a first target duration when the fuel cut condition is satisfied; determining whether a decrease amount of an intake pressure by operation of the CVVD apparatus is within a first predetermined range; and determining that the CVVD apparatus is in a failure state when the decrease amount of the intake pressure by operation of the CVVD apparatus is not within the first predetermined range.

An apparatus for diagnosing an engine system including a continuous variable valve duration (CVVD) apparatus according to another exemplary embodiment of the present invention may include: an accelerator pedal position detector configured to detect a position of an accelerator pedal; a brake pedal position detector configured to detect a position of a brake pedal; a vehicle speed detector configured to detect a speed of a vehicle; an intake pressure detector configured to detect an intake pressure; and a controller configured to determine whether a fuel cut condition is satisfied and determining whether the CVVD apparatus is in a failure state when the fuel cut condition is satisfied, wherein the controller operates the CVVD apparatus wherein a duration of an exhaust valve becomes a first target duration when the fuel cut condition is satisfied and determines that the CVVD apparatus is in the failure state when a decrease amount of the intake pressure by operation of the CVVD apparatus is not within a first predetermined range.

According to an exemplary embodiment of the present invention, a failure of a continuous variable valve duration apparatus may be diagnosed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
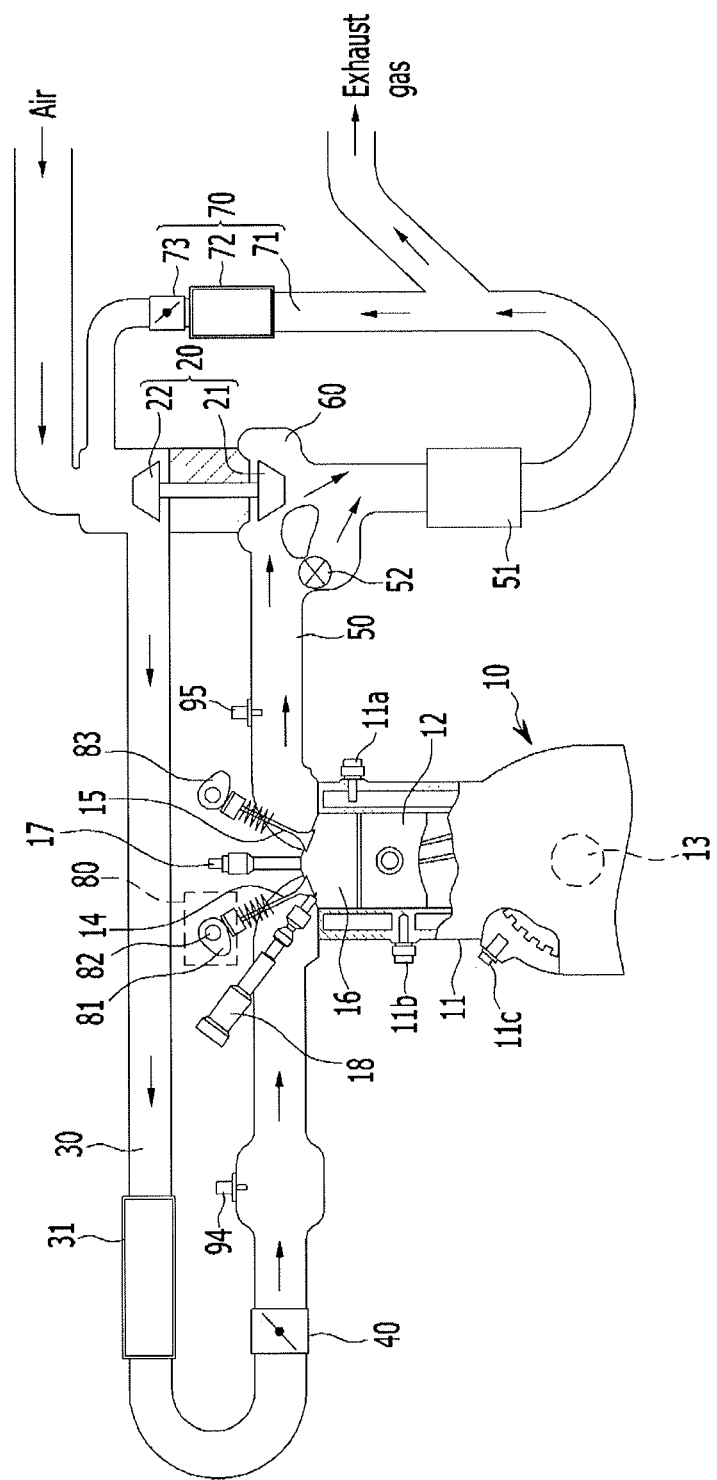
FIG. 1 is a schematic diagram of an engine system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
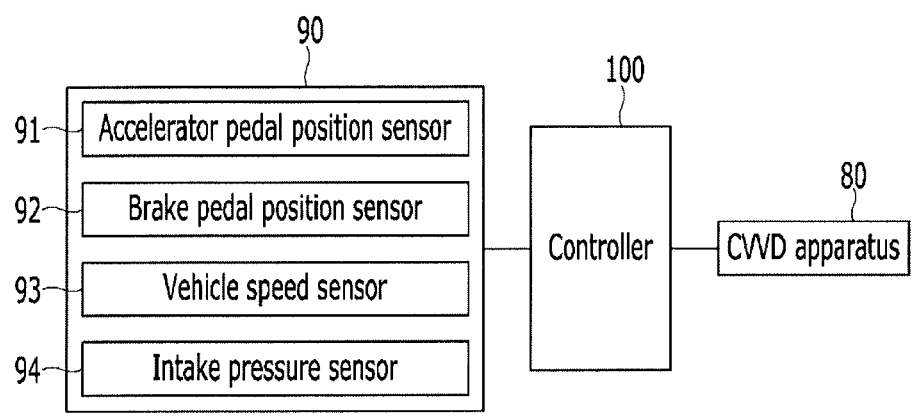
FIG. 2 is a block diagram of an apparatus for diagnosing an engine system according to an exemplary embodiment of the present invention.

FIG. 1 is a schematic diagram of an engine system according to an exemplary embodiment of the present invention, and FIG. 2 is a block diagram of an apparatus for diagnosing an engine system according to an exemplary embodiment of the present invention.

Referring to FIG. 1 and FIG. 2, an engine system according to an exemplary embodiment of the present invention may include an engine 10, a turbocharger 20, an intake line 30, a throttle valve 40, a first exhaust line 50, a second exhaust line 60, a low pressure exhaust gas recirculation (LP-EGR) apparatus 70, and a continuous variable valve duration (CVVD) apparatus 80.

The engine 10 burns fuel and air to convert chemical energy into mechanical energy. The engine 10 includes a cylinder 11, a piston 12, a crankshaft 13, an intake valve 14, and an exhaust valve 15.

The piston 12 and the crankshaft 13 are mounted in the cylinder 11. The piston 12 reciprocates by an explosive force of the fuel and rotates the crankshaft 13. A combustion chamber 16 is formed between the cylinder 11 and the piston 12.

The engine 10 is connected to the intake line 30 to receive air, and an exhaust gas generated in a combustion process is exhausted to the outside of the engine 10 through the first exhaust line 50. The intake line 30 is opened or blocked by the intake valve 14, and the first exhaust line 50 is opened or blocked by the exhaust valve 15. The intake valve 14 may be operated by an intake cam 81 of the CVVD apparatus 80, and the exhaust valve 15 may be operated by an exhaust cam 83.

An injector 17 injects fuel into the combustion chamber 16, and a spark plug 18 ignites mixed gas in which the fuel and the air are mixed.

A coolant temperature detector 11*a*, a knock detector 11*b*, and a crankshaft position detector 11*c* are mounted to the cylinder 11. The coolant temperature detector 11*a* is configured to detect a temperature of coolant and transmits a signal corresponding thereto to a controller 100. The knock detector 11*b* is configured to detect a vibration and transmits a signal corresponding thereto to the controller 100, and the controller 100 is configured to determine whether knocking occurs based on the signal of the knock sensor 11*b*. The crankshaft position detector 11*c* is configured to detect a rotation angle of the crankshaft 13 and transmits a signal corresponding thereto to the controller 100, and the controller 100 determines a speed of the engine 10 based on the signal of the crankshaft position sensor 11*c*.

The turbocharger 20 includes a turbine 21 and a compressor 22. The turbine 21 may rotate by the exhaust gas, and the compressor 22 may rotate by the power occurring by a rotation of the turbine 21.

The intake line 30 supplies air to the engine 10. While the compressor 22 rotates, air drawn from the outside is compressed to be supplied to the engine 10. Therefore, a high pressure air is supplied to enhance an output of the engine 10. To cool air that passes through the compressor 22, an intercooler 31 may be mounted on the intake line 30.

The throttle valve 40 is mounted on the intake line 30, and the flow of air supplied from the intake line 30 to the engine 10 is controlled according to an opening degree of the throttle valve 40.

An intake pressure detector 94 is mounted on the intake line 30 between the throttle valve 40 and the engine 10 and configured to detect an intake pressure to transmit a signal corresponding thereto to the controller 100.

The first exhaust line 50 exhausts the exhaust gas expelled from the engine 10 to the outside of a vehicle. A catalyst 51 may be mounted on the first exhaust line 50 to reduce a harmful component of the exhaust gas.

The second exhaust line 60 is formed wherein a portion of an exhaust gas joins the first exhaust line 50 via the turbine 21. An amount of the exhaust gas that passes through the turbine 21 is controlled according to an opening degree of a wastegate valve 52 mounted on the first exhaust line 50.

An exhaust pressure detector 95 is mounted on the first exhaust line 50 and configured to detect an exhaust pressure to transmit a signal corresponding thereto to the controller 100.

The low pressure EGR apparatus 70 may include an EGR line 71, an EGR cooler 72, and an EGR valve 73.

The EGR line 71 may connect downstream of the catalyst 51 and the intake line 30. A portion of the exhaust gas exhausted from the catalyst 51 may be resupplied to the engine 10 via the EGR line 71.

The EGR cooler 72 is mounted on the EGR line 71 to cool the exhaust gas supplied to the intake line 30.

The EGR valve 73 is mounted on the EGR line 71. When the EGR valve 73 is opened, a portion of the exhaust gas exhausted from the catalyst 51 may be resupplied to the engine 10 via the EGR line 71. When the EGR valve 73 is closed, the exhaust gas exhausted from the catalyst 51 is not resupplied to the engine 10 via the EGR line 71. An exhaust gas supplied to the intake line 30 via the EGR line 71 according to an opening amount of the EGR valve 73 is referred to as an external EGR gas.

The CVVD apparatus 80 adjusts a duration of the intake valve 14. The CVVD apparatus 80 includes the intake cam 81 and a camshaft 82. The CVVD apparatus 80 may change a relative rotation speed of the intake cam 81 with respect to the camshaft 81. In other words, the duration of the intake valve 14 increases or decreases according to operation of the CVVD apparatus 80. Since the CVVD apparatus 80 is described in Korean Patent Application No. 10-2015-0178650, a detailed description thereof will be omitted. In addition, It is to be understood that entire contents included in Korean Patent Application No. 10-2015-0178650 are a reference and are entirely included in the present specification. The CVVD apparatus 80 described in Korean Patent Application No. 10-2015-0178650 is an example of a continuous variable valve duration (CVVD) apparatus to which the spirit or scope of the present invention may be applied, and the spirit or scope of the present invention may be applied to various CVVD apparatuses as well as the CVVD apparatus 80 described in Korean Patent Application No. 10-2015-0178650.

Valve overlap, which is a portion in which the intake valve 14 and the exhaust valve 15 are simultaneously opened, occurs according to operation of the CVVD apparatus 80, and thus a portion of the exhaust gas exhausted from the combustion chamber 16 may be resupplied to the combustion chamber 16. An exhaust gas that is resupplied to the combustion chamber 16 according to operation of the CVVD apparatus 80 is referred to as an internal EGR gas. A temperature of the combustion chamber 16 may be lowered using the internal EGR gas. In an exemplary embodiment of the present invention, it is illustrated that the CVVD apparatus 80 adjusts the duration of the intake valve 14, but the scope or spirit of the present invention may be applied to a case in which the CVVD apparatus 80 adjusts a duration of the exhaust valve 15.

An apparatus for diagnosing an engine system according to an exemplary embodiment of the present invention may include a data detector 90, the controller 100, and the CVVD apparatus 80.

The data detector 90 is configured to detect data for diagnosing the engine system, and the data detected by the data detector 90 is transmitted to the controller 100. The data detector 90 may include an accelerator pedal position detector 91, a brake pedal position detector 92, a vehicle speed detector 93, and an intake pressure detector 94. The data detector 90 may further include detectors (e.g., oxygen detector and so on) for controlling the engine system.

The accelerator pedal position detector 91 is configured to detect a position of an accelerator pedal (i.e., a pushed degree of the accelerator pedal) and transmits a signal corresponding thereto to the controller 100. When the accelerator pedal is pushed completely, the position of the accelerator pedal is 100%, and when the accelerator pedal is not pushed, the position of the accelerator pedal is 0%.

The brake pedal position detector 92 is configured to detect a position of a brake pedal (i.e., a pushed degree of the brake pedal) and transmits a signal corresponding thereto to the controller 100. When the brake pedal is pushed completely, the position of the brake pedal is 100%, and when the brake pedal is not pushed, the position of the brake pedal is 0%.

The vehicle speed detector 93 is configured to detect a speed of the vehicle and transmits a signal corresponding thereto to the controller 100.

The intake pressure detector 94 is configured to detect an intake pressure of air flowing into the engine 10 and transmits a signal corresponding thereto to the controller 100.

The controller 100 may diagnose a failure of the CVVD apparatus 80 based on the data detected by the data detector

90. The controller 100 may be implemented with at least one processor operating by a predetermined program, and the predetermined program may include a series of commands for performing each step included in a method of diagnosing an engine system according to an exemplary embodiment of the present invention to be described later. Further, the controller 100 may control operations of the throttle valve 40, the EGR valve 73, and the CVVD apparatus 80 based on the data detected by the data detector 90.

Figure 3:
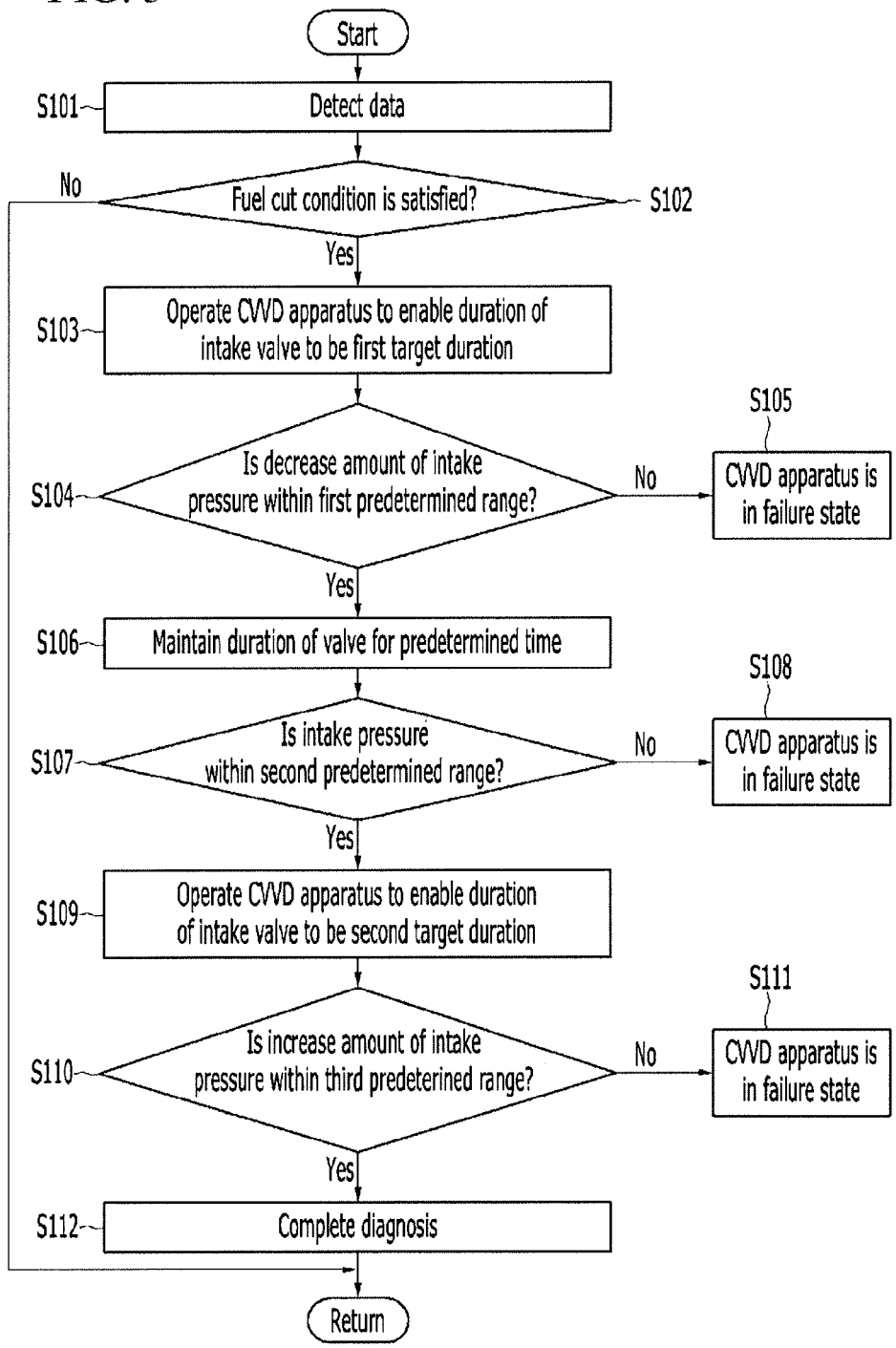
FIG. 3 is a flowchart illustrating a method of diagnosing an engine system according to an exemplary embodiment of the present invention.

FIG. 3 is a flowchart illustrating a method of diagnosing an engine system according to an exemplary embodiment of the present invention.

As shown in FIG. 3, the controller 100 detects data for diagnosing the engine system at step S101. In other words, the accelerator pedal position detector 91 detects the position of the accelerator pedal, the brake pedal position detector 92 detects the position of the brake pedal, the vehicle speed detector 93 detects the speed of the vehicle, and the intake pressure detector 94 detects the intake pressure.

The controller 100 determines whether a fuel cut condition is satisfied based on the data at step S102. For example, the fuel cut condition may be satisfied when the vehicle coasts, and the controller 100 may determine whether the fuel cut condition is satisfied based on the position of the accelerator pedal, the position of the brake pedal, and the speed of the vehicle. For example, when the speed of the vehicle is equal to or greater than a predetermined speed (e.g., 30 kph) and when the position of the accelerator pedal and the position of the brake pedal are 0%, the fuel cut condition may be satisfied.

When the fuel cut condition is not satisfied at step S102, a method of diagnosing an engine system according to an exemplary embodiment of the present invention is terminated.

When the fuel cut condition is satisfied at step S102, the controller 100 operates the CVVD apparatus 80 to enable a duration of the intake valve 14 to be a first target duration at step S103. Since the throttle valve 40 is closed in the fuel cut state, an intake pressure may be changed according to a duration of the intake valve 14. That is, as a duration of the intake valve 14 increases, the intake pressure decreases.

The controller 100 may determine whether a decrease amount of the intake pressure by operation of the CVVD apparatus 80 is within a first predetermined range at step S104. The first target duration may be determined through an experiment wherein a decrease amount of an intake pressure has a predetermined value within the first predetermined range. In other words, a decrease amount of an intake pressure according to operation of the CVVD apparatus 80 may be acquired through an experiment, and the first target duration and the first predetermined range may be determined to a value and a range that are determined as a preferable value and a preferable range by a person of ordinary skill in the art.

When the decrease amount of the intake pressure is not within the first predetermined range at step S104, the controller 100 may determine that the CVVD apparatus 80 is in a failure state at step S105. In other words, when the CVVD apparatus 80 is in the failure state, a duration of the intake valve 14 may not be changed to the first target duration and thus the intake pressure is not reduced to a value within the first predetermined range.

When the decrease amount of the intake pressure is within the first predetermined range at step S104, the controller 100 maintains a duration of the intake valve 14 to the target duration for a predetermined time and monitors the intake pressure at a time point at which the predetermined time has elapsed at step S106.

The controller 100 may determine whether the intake pressure at the time point at which the predetermined time has elapsed is within a second predetermined range at step S107. An intake pressure when a duration of the intake valve 14 is the first target duration for the predetermined time may be acquired through an experiment, and the second predetermined range may be determined to a range that is determined as a preferable range by a person of ordinary skill in the art.

When the intake pressure is not within the second predetermined range at step S107, the controller 100 may determine that the CVVD apparatus 80 is in the failure state at step S108. In other words, when the CVVD apparatus 80 is in the failure state, the controller 100 may determine that the intake pressure has deviated from the second predetermined range.

When the intake pressure is within the second predetermined range at step S107, the controller 100 operates the CVVD apparatus 80 to enable a duration of the intake valve 14 to be a second target duration at step S109. The second target duration is less than the first target duration, and when a duration of the intake valve 14 reduces, an intake pressure may increase.

The controller 100 may determine whether an increase amount of the intake pressure by operation of the CVVD apparatus 80 is within a third predetermined range at step S110. The second target duration may be determined through an experiment wherein an increase amount of an intake pressure has a predetermined value within the third predetermined range. In other words, an increase amount of an intake pressure according to operation of the CVVD apparatus 80 may be acquired through an experiment, and the second target duration and the third predetermined range may be determined to a value and a range that are determined as a preferable value and a preferable range by a person of ordinary skill in the art.

When the increase amount of the intake pressure is not within the third predetermined range at step S110, the controller 100 may determine that the CVVD apparatus 80 is in the failure state at step S111. In other words, when the CVVD apparatus 80 is the failure state, the controller 100 may determine that the duration of the intake valve 14 does not follow the second target duration.

When the increase amount of the intake pressure is within the third predetermined range at step S110, the controller 100 completes diagnosis of the engine system at step S112. In other words, the controller 100 may determine that the CVVD apparatus 80 is in a normal state.

In an exemplary embodiment of the present invention, it is illustrated that the CVVD apparatus 80 adjusts a duration of the intake valve 14, but even in a case in which the CVVD apparatus 80 adjusts a duration of the exhaust valve 15, a failure of the CVVD apparatus 80 may be diagnosed with the method of diagnosing an engine system.

As described above, according to an exemplary embodiment of the present invention, a failure of the CVVD apparatus 80 may be diagnosed.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of diagnosing an engine system including a continuous variable valve duration (CVVD) apparatus, the method comprising:
    detecting data for diagnosing the engine system;
    determining whether a fuel cut condition is satisfied based on the detected data;
    operating the CVVD apparatus, wherein a duration of an intake valve is a first target duration when the fuel cut condition is satisfied;
    determining whether a decrease amount of an intake pressure by operation of the CVVD apparatus is within a first predetermined range; and
    determining that the CVVD apparatus is in a failure state when the decrease amount of the intake pressure by operation of the CVVD apparatus is not within the first predetermined range.

2. The method of claim 1, further including:
    maintaining the duration of the intake valve to the first target duration for a predetermined time when the decrease amount of the intake pressure by operation of the CVVD apparatus is within the first predetermined range;
    monitoring the intake pressure at a time point at which the predetermined time has elapsed; and
    determining whether the intake pressure at the time point at which the predetermined time has elapsed is within a second predetermined range.

3. The method of claim 2, further including determining that the CVVD apparatus is in the failure state when the intake pressure at the time point at which the predetermined time has elapsed is not within the second predetermined range.

4. The method of claim 2, further including operating the CVVD apparatus wherein the duration of the intake valve is a second target duration when the intake pressure at the time point at which the predetermined time has elapsed is within the second predetermined range,
    wherein the second target duration is less than the first target duration.

5. The method of claim 4, further including:
    determining whether an increase amount of the intake pressure by operation of the CVVD apparatus is within a third predetermined range; and
    determining that the CVVD apparatus is in the failure state when the increase amount of the intake pressure by operation of the CVVD apparatus is not within the third predetermined range.

6. The method of claim 5, further including determining that the CVVD apparatus is in a normal state when the increase amount of the intake pressure by operation of the CVVD apparatus is within the third predetermined range.

7. An apparatus for diagnosing an engine system including a continuous variable valve duration (CVVD) apparatus, the apparatus comprising:
    an accelerator pedal position detector configured for detecting a position of an accelerator pedal;
    a brake pedal position detector configured for detecting a position of a brake pedal;
    a vehicle speed detector configured for detecting a speed of a vehicle;
    an intake pressure detector configured for detecting an intake pressure; and
    a controller configured for determining whether a fuel cut condition is satisfied and determining whether the CVVD apparatus is in a failure state when the fuel cut condition is satisfied,
    wherein the controller operates the CVVD apparatus, wherein a duration of an intake valve is a first target duration when the fuel cut condition is satisfied and determines that the CVVD apparatus is in the failure state when a decrease amount of the intake pressure by operation of the CVVD apparatus is not within a first predetermined range.

8. The apparatus of claim 7, wherein the controller is configured to maintain the duration of the intake valve to the first target duration for a predetermined time when the decrease amount of the intake pressure by operation of the CVVD apparatus is within the first predetermined range, monitors the intake pressure at a time point at which the predetermined time has elapsed, and determines whether the intake pressure at the time point at which the predetermined time has elapsed is within a second predetermined range.

9. The apparatus of claim 8, wherein the controller is configured to determine that the CVVD apparatus is in the failure state when the intake pressure at the time point at which the predetermined time has elapsed is not in the second predetermined range.

10. The apparatus of claim 8, wherein the controller operates the CVVD apparatus wherein the duration of the intake valve is a second target duration when the intake pressure at the time point at which the predetermined time has elapsed is within the second predetermined range and the second target duration is less than the first target duration.

11. The apparatus of claim 10, wherein the controller is configured to determine whether an increase amount of the intake pressure by operation of the CVVD apparatus is within a third predetermined range and determines that the CVVD apparatus is in the failure state when the increase amount of the intake pressure by operation of the CVVD apparatus is not within the third predetermined range.

12. The diagnosis apparatus of claim 11, wherein the controller is configured to determine that the CVVD apparatus is in a normal state when the increase amount of the intake pressure by operation of the CVVD apparatus is within the third predetermined range.

13. A method of diagnosing an engine system including a continuous variable valve duration (CVVD) apparatus, the method comprising:
    detecting data for diagnosing the engine system;
    determining whether a fuel cut condition is satisfied based on the detected data;
    operating the CVVD apparatus, wherein a duration of an exhaust valve is a first target duration when the fuel cut condition is satisfied;

determining whether a decrease amount of an intake pressure by operation of the CVVD apparatus is within a first predetermined range; and determining that the CVVD apparatus is in a failure state when the decrease amount of the intake pressure by operation of the CVVD apparatus is not within the first predetermined range.

14. An apparatus for diagnosing an engine system including a continuous variable valve duration (CVVD) apparatus, the apparatus comprising:

an accelerator pedal position detector configured for detecting a position of an accelerator pedal;

a brake pedal position detector configured for detecting a position of a brake pedal;

a vehicle speed detector configured for detecting a speed of a vehicle;

an intake pressure detector configured for detecting an intake pressure; and a controller configured for determining whether a fuel cut condition is satisfied and determining whether the CVVD apparatus is in a failure state when the fuel cut condition is satisfied, wherein the controller operates the CVVD apparatus, wherein a duration of an exhaust valve is a first target duration when the fuel cut condition is satisfied, and determines that the CVVD apparatus is in the failure state when a decrease amount of the intake pressure by operation of the CVVD apparatus is not within a first predetermined range.

* * * * *